United States Patent
Bone

[11] Patent Number: 6,050,759
[45] Date of Patent: Apr. 18, 2000

[54] DEPTH OF CUT MECHANISM

[75] Inventor: Daniel Bone, Langley Moor, United Kingdom

[73] Assignee: Black & Decker Inc., Newark, Del.

[21] Appl. No.: 08/967,249

[22] Filed: Nov. 5, 1997

Related U.S. Application Data

[63] Continuation of application No. 08/711,403, Sep. 5, 1996, abandoned.

[30]   Foreign Application Priority Data

Sep. 11, 1995 [GB] United Kingdom .................. 9517154

[51] Int. Cl.$^7$ ...................................................... B23C 1/20
[52] U.S. Cl. ........................ 409/182; 408/95; 408/241 S; 409/206
[58] Field of Search ................................ 409/130, 178, 409/182, 218, 204, 206; 144/136.95, 144.1, 154.5; 408/14, 97, 95, 110, 113, 202, 241 S; 81/429

[56]   References Cited

U.S. PATENT DOCUMENTS

| | | |
|---|---|---|
| 1,514,894 | 11/1924 | Carter ...................................... 409/178 |
| 2,562,143 | 7/1951 | Godfrey et al. ......................... 409/182 |
| 2,710,549 | 6/1955 | Cogsdill .................................. 408/202 |
| 3,162,221 | 12/1964 | Lacey ..................................... 409/182 |
| 3,443,479 | 5/1969 | Hawley et al. ..................... 144/136.95 |
| 3,527,273 | 9/1970 | Falter ...................................... 408/113 |
| 3,581,787 | 6/1971 | Bane ...................................... 409/178 |
| 4,674,548 | 6/1987 | Mills et al. ............................. 409/182 |
| 5,096,342 | 3/1992 | Blankenship et al. .................. 408/113 |
| 5,613,813 | 3/1997 | Winchester et al. .................... 409/182 |

FOREIGN PATENT DOCUMENTS

| | | |
|---|---|---|
| 900335 | 7/1962 | United Kingdom . |
| 1359599 | 7/1974 | United Kingdom . |

*Primary Examiner*—Daniel W. Howell
*Attorney, Agent, or Firm*—Bruce S. Shapiro; Dennis A. Dearing; John D. Del Ponti

[57]   ABSTRACT

A hand held router (2) includes a rotatable member (22) having screwthread engagement with the housing (4) of the router (2). Rotation of the rotatable member (22) causes adjustment of the depth of cut of the router bit (18) protruding through the rotatable member (22). A releasable detent means (30) engages with latching members (28) in the rotatable member (22) thereby to enable locking of the depth of cut mechanism.

11 Claims, 4 Drawing Sheets

DEPTH OF CUT MECHANISM

This application is a continuation of application Ser. No. 08/711,403, filed on Sep. 5, 1996 now abandoned.

The present invention relates to a depth of cut mechanism for a power tool which has particular, although not exclusive, relevance to applications with hand-held routers.

Conventional routers comprise a router bit mounted on a rotatable spindle which spindle has rotational movement imparted thereto by an electric motor. The entire mechanism of the motor, spindle and router bit are held within a housing which housing is coupled to two arms having at the end remote from the housing an end stop which abuts a workpiece. The housing is moveable relative to the end stop along the arms by means of a releasable locking mechanism. When the locking mechanism is released, the user may adjust the distance between the housing and the end stop by means of either forcing the arms into the housing or withdrawing the arms from the housing. Generally the arms have springs therearound such that the end stop is generally biased as far away from the housing as their travel of the arms will permit. This equates to a minimum depth of cut for the router bit because the router bit protrudes through the end stop in a central position.

For the user of the device to adjust the depth of cut it is necessary first to release the locking mechanism and maintain sufficient pressure against the end stop in order for the required distance between the housing and the end stop to be achieved. This then ensures that the required protrusion beyond the depth stop by the router bit for the necessary depth of cut in the workpiece is achieved.

The method of achieving depth of cut adjustment as described above is problematical however. It will be apparent that even if a scale is provided for the user, the adjustment is in a linear fashion, i.e. the housing, the arms and the end stop are all in line and so the user must exert a great deal of control and accuracy in order to enable an accurate depth of cut control. For example, if the depth of cut is to be adjustable to within say 0.1 mm, then conventional router adjustments are not satisfactory.

A further shortcoming of the above depth of cut adjustment mechanism is that in use of the device the user generally looks down from above the router bit and thus the perspective of the user is wholly inadequate in order to accurately view the length of projection of the top of the router bit beyond the end stop. Should the user wish to optically confirm that the protrusion of the end of the router bit is of a satisfactory length, then the user will need to stop operating the router bit and move their head down in line with the plane of the depth stop.

It is thus an object of the present invention to provide a depth of cut mechanism which at least alleviates the aforementioned shortcomings.

According to the present invention there is provided a depth of cut mechanism for a power tool comprising; a rotatable member having a screwthread for engagement with a corresponding screwthread on the power tool; a plurality of latching members formed around the periphery of the rotatable member; and a releasable detent means for engaging with the latching members, the releasable detent means being biased towards a first position for engagement with the latching members thereby to prevent rotation of the rotatable member and moveable towards a second position wherein the rotatable member is free to rotate; and wherein rotation of the rotational member relative to the power tool enables adjustment of the depth of cut of the power tool. By provision of a rotatable member whose screwthread engagement with the power tool causes adjustment of the depth stop, a more accurate and easily adjustable depth of cut mechanism is provided than has been previously available.

Preferably the rotatable member comprises a generally cylindrical cowling having an internal screwthread for engagement with an external screwthread of the power tool. Additionally or alternatively each of the plurality of latching members comprises a furrow extending longitudinally in a direction parallel to the axis of rotation of the rotatable member.

Advantageously the detent means comprises a moveable trigger mechanism mounted on the power tool.

The present invention will now be described by way of example only and with reference to the following drawings.

Figure 1:
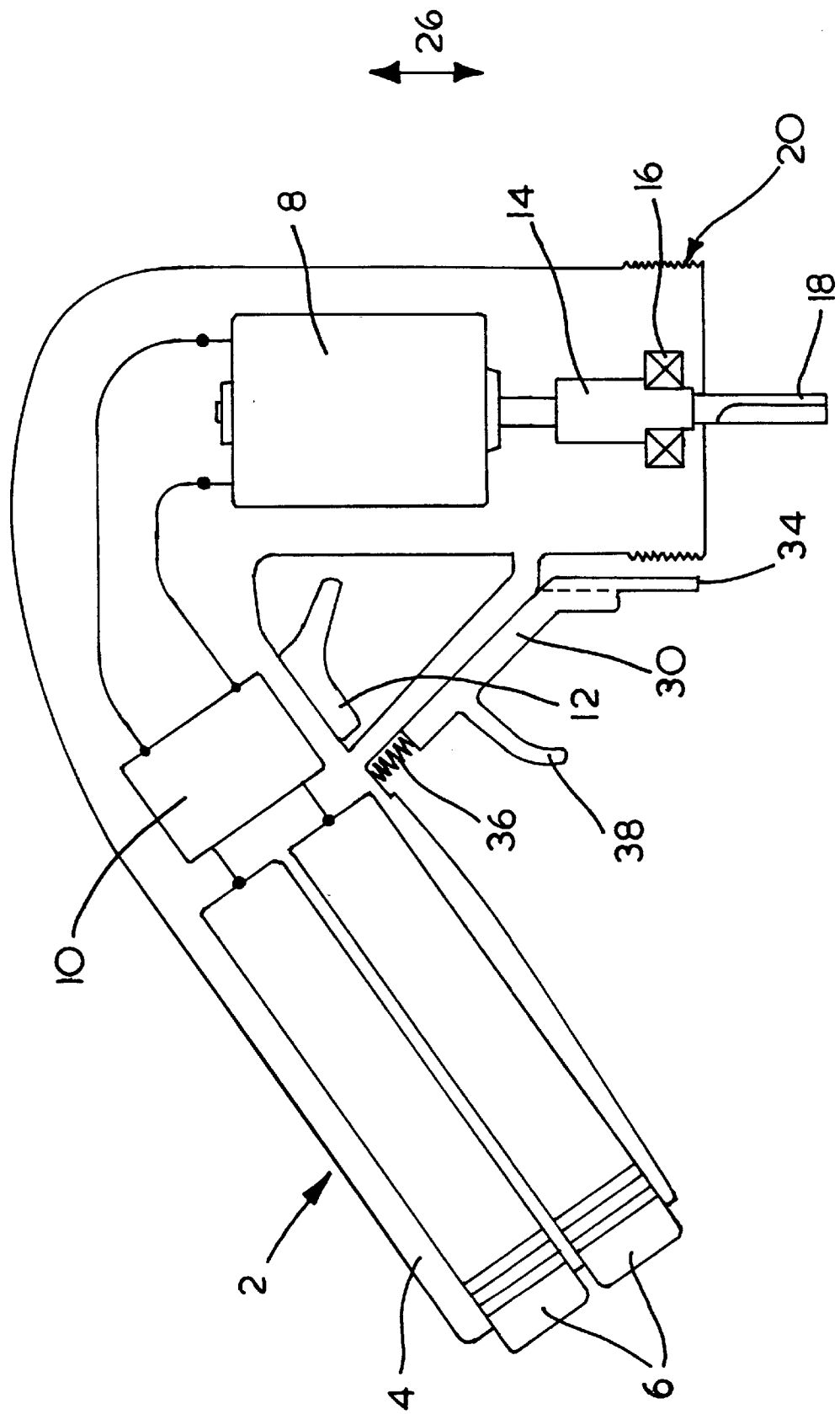
FIG. 1 illustrates schematically a sectional view of a router in accordance with the present invention.
Figure 6:
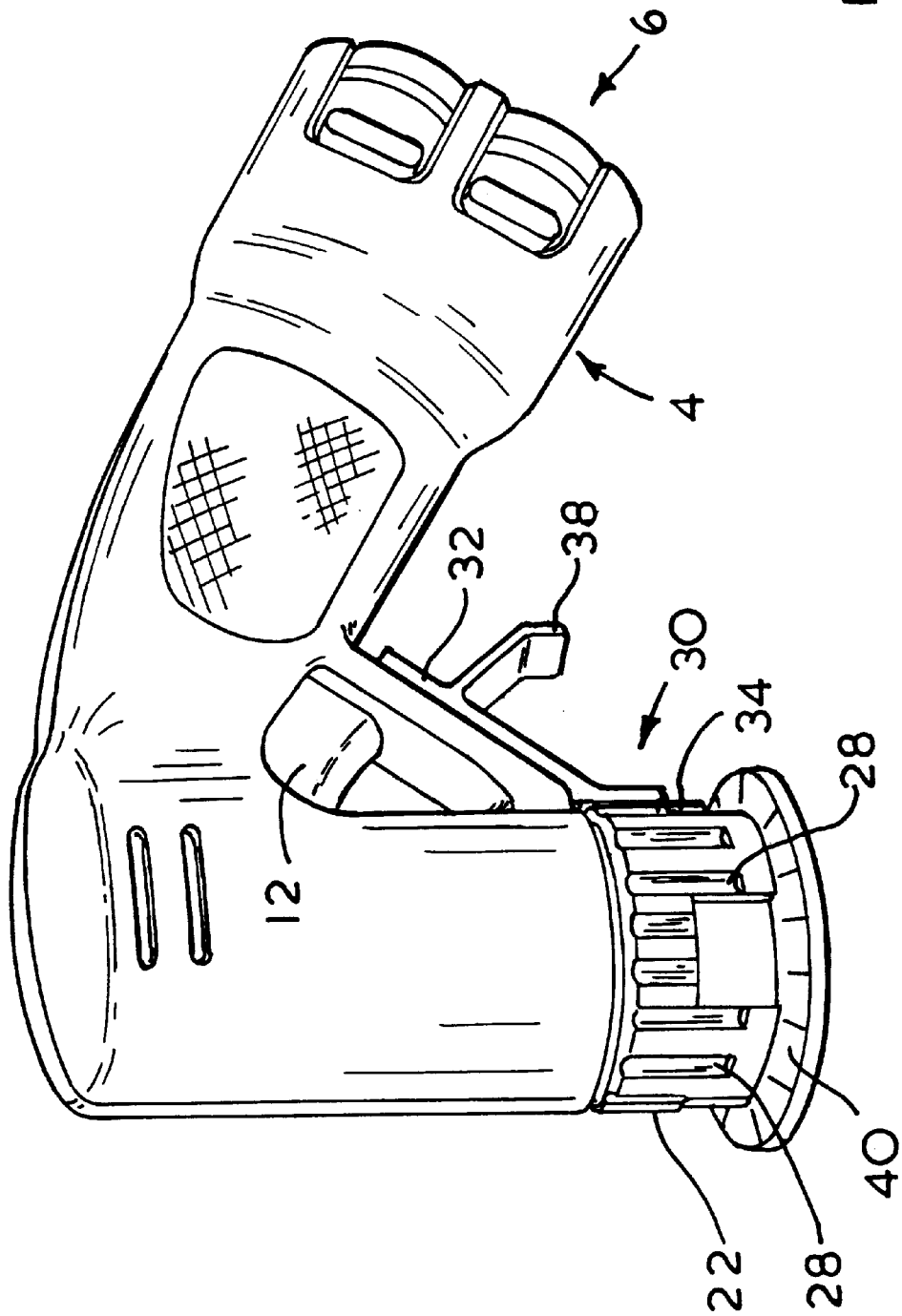
FIG. 6 illustrates a perspective view of a router in accordance with the present invention.

Referring now to FIGS. 1 and 6, it can be seen that the router shown generally as 2 comprises a housing 4 within which a plurality of rechargeable batteries 6 are accommodated. The batteries 6 are coupled to a motor 8 via an electrical connector 10 and switch 12. When the user actuates switch 12 the batteries 6 are coupled to the motor 8. The motor has an output spindle 14 mounted on bearings 16. A router bit 18 is received by the output spindle 14.

At the end of the housing 4 adjacent the router bit 18 it can be seen that there is formed a screwthread 20. The screwthread in this example is formed on the external part of the housing 4.

Figure 2:
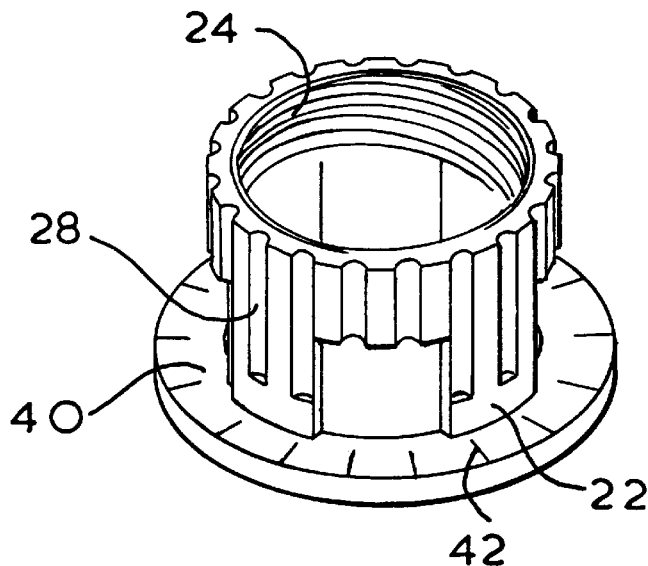
FIG. 2 illustrates a perspective view of a rotatable member in accordance with the present invention.

Referring now also to FIGS. 2 and 3 it can be seen that a rotatable member, in this case a transparent plastics cowling 22, has an internal screwthread formed thereon 24. The internal screwthread 24 co-operates with the external screwthread 20. The pitch of the screwthread, in this example is chosen that for every revolution of the transparent plastics cowling 22 a linear movement in a plane orthogonal to the axis of rotation, i.e. up or down with reference to FIG. 1 as shown in the direction of the arrow 26, of 2 mm is made. Thus the depth of cut for the router bit can be adjusted by simple rotation of the plastics cowling 22.

It can be seen that around the periphery of the cowing are a plurality of latching members, here furrows 28, extending longitudinally in a direction parallel to the axis of rotation of the cowling 22. In this example there are twenty such furrows 28 around the periphery of the transparent plastics cowling 22 for reasons which will become apparent below. It will be seen that the router 2 has mounted thereon a releasable detent means, here a moveable lock 30, which includes at least one arm 32 which arm 32 has formed thereon a projection 34 to co-operate with each of the furrows 28 of the transparent plastics cowling 22. The moveable lock 30 is biased by means of a mechanical compression spring 36 generally towards the plastics cowling 22 such that in its rest position, the moveable lock 30 acts so as to prevent rotation of the transparent plastics cowling 22. The moveable lock 30 includes a trigger arm 38 operable by a user in order to withdraw the release one arm 32 away from any corresponding furrow 28. Such withdrawal of the lock 30 allows the user to rotate the transparent plastics cowling 22 thereby to adjust the depth of cut of the router bit.

It can be seen that the projection 34 and arm 32, in a similar manner to the furrow 28, also extend longitudinally in a direction parallel to the axis of rotation of the transparent plastics cowling 22. This is so that when the user either locks or releases the cowling 22 the projections 34 extend along the length of the furrows 28 thereby forming a tight fit.

It will be seen also from FIGS. 2 and 3 that the transparent plastics cowling is formed as a generally cylindrical member, one end of which supports a flange 40. The flange as shown in FIG. 2 supports a plurality of gradation markings 42, each of the gradation markings 42 being adjacent a respective furrow 28. As has been described above, because there are twenty such furrows around the periphery of the cowling 22 and one complete revolution of the cowling equates to a linear rise or fall of the cowling of 2 mm then each of these gradations indicates a linear rise or fall of the router bit of exactly 0.1 mm with respect to flange 40.

Figure 4:
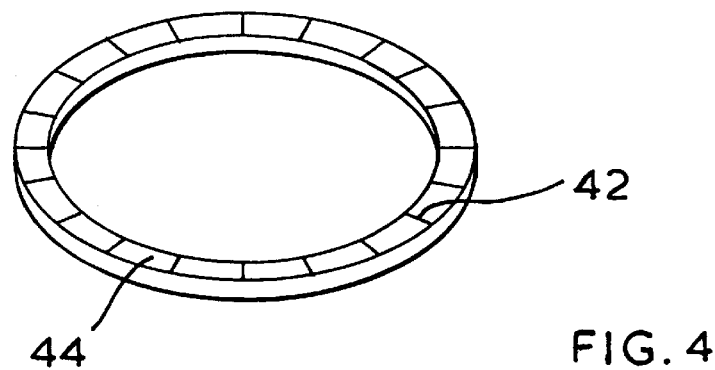
FIG. 4 shows a perspective view of a circular ring in accordance with the present invention.
Figure 5:
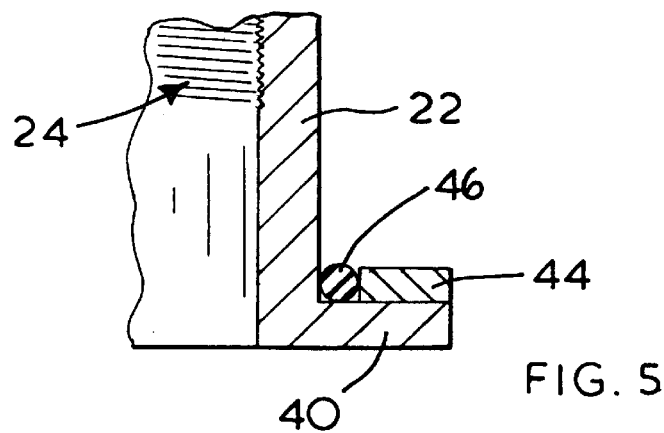
FIG. 5 illustrates a partial sectional view of the rotatable member of FIG. 2 carrying the circular ring of FIG. 4.
Figure 3A:
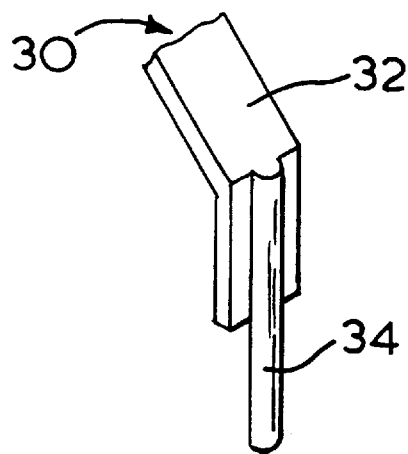
FIGS. 3a, 3b, 3c and 3d illustrate partial section and schematic views of the rotatable member of FIG. 2.
Figure 3B:
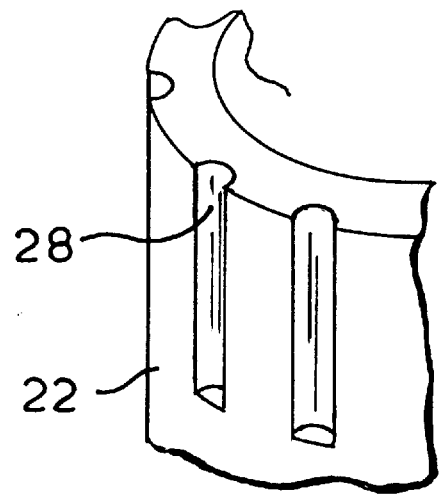
Figure 3C:
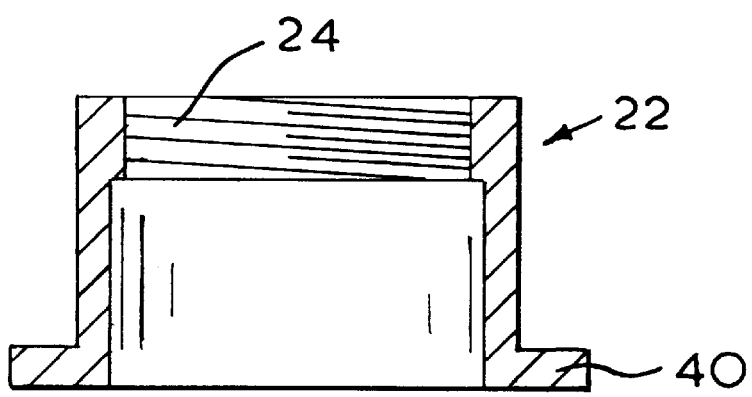
Figure 3D:
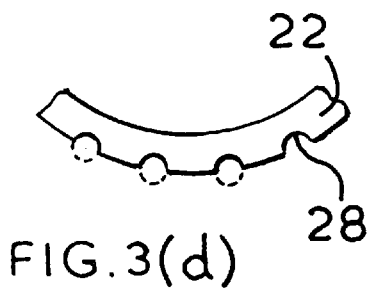

It will be apparent however, that it is often useful for the user to be able to re-set (to zero for example) the depth of cut for any particular circumstance. In this regard reference is now made also to FIGS. 4 and 5 which show a circular ring 44 which sits around the flange 40 and which ring 44 also bears gradations 42. The gradations 42 are also arranged to correspond exactly to the peripheral distance between each of the furrows 28. In order to allow the ring 44 to be easily adjustable there sits between the ring and the wall of the plastics cowling 22 a circular ring 46. The circular ring in this example is formed from a nitrile rubber in order to provide vibration damping and high frictional contact between the ring 44 and the cowling 22. It would be apparent that resetting of the gradation scale is then simply a matter of rotating the ring 44 relative to the cowling 22 in accordance with the desires of the user.

It will be apparent to those skilled in the art that by forming the flange 40 in a circular manner then if the flange 40 is used to abut a fence in order to provide a guide for operating the router bit then it does not matter what the angular disposition of the router in relation to the axis of rotation of the flange 40 so long as the router bit 18 sits centrally within the confines of the cowling 22. Rotation about the axis of the cowling 22 will not alter the distance between the router bit 18 and the periphery of the flange 40. This enables accurate use of the router 2.

What is claimed is:

1. A depth-of-cut mechanism for a power tool including a housing, comprising:

a rotatable member having a screwthread for engagement with a corresponding screwthread on a power tool housing;

a plurality of latch members formed around the periphery of the rotatable member and a releasable detent means for engaging with the latch members, the releasable detent means being biased towards a first position for engagement with the latching members thereby to prevent rotation of the rotatable member and movable towards a second position wherein the rotatable member is free to rotate; and wherein rotation of the rotatable member relative to the power tool enables adjustment of the depth of cut of the power tool.

2. A depth-of-cut mechanism according to claim 1, wherein the rotatable member comprises a generally cylindrical cowling having an internal screwthread for engagement with an external screwthread of the power tool.

3. A depth-of-cut mechanism according to claim 1, wherein each of the plurality of latching members comprises a furrow extending longitudinally in a direction parallel to the axis of rotation of the rotatable member.

4. A depth-of-cut mechanism according to claim 1, wherein the detent means comprises a movable locking mechanism mounted on the power tool.

5. A depth-of-cut mechanism according to claim 3, wherein the detent means includes at least one arm member extending longitudinally in a direction parallel to the axis of rotation of the rotatable member and wherein, in the first position, that at least one arm member sits in the furrow thereby to prevent rotation of the rotatable member.

6. A depth-of-cut mechanism according to claim 5, wherein the at least one arm member includes a projection for engagement with the furrows of the plurality of latching members.

7. A depth-of-cut mechanism according to claim 2 including, at one end of the generally cylindrical cowling, a circular flange for abutting a work piece in use of the mechanism.

8. A depth-of-cut mechanism according to claim 7, wherein the circular flange bears a plurality of gradation markings.

9. A depth-of-cut mechanism according to claim 8, wherein each gradation marking of the plurality of gradation markings corresponds to a respective furrow formed on the plurality of latching members.

10. A depth-of-cut mechanism according to claim 7, wherein a circular ring is carried by the circular flange, which circular ring carries gradation markings and is axially fixed, but rotatably movable with respect to the flange.

11. A depth-of-cut mechanism according to claim 10, wherein a resilient ring member is radially disposed between the cylindrical cowling and the circular ring.

\* \* \* \* \*